United States Patent
Jiang

(10) Patent No.: US 11,446,581 B2
(45) Date of Patent: Sep. 20, 2022

(54) METHOD AND APPARATUS FOR CONTROLLING VIRTUAL REALITY SHOOTING GAME

(71) Applicant: NETEASE (HANGZHOU) NETWORK CO., LTD., Zhejiang (CN)

(72) Inventor: Fan Jiang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/281,974

(22) PCT Filed: May 25, 2020

(86) PCT No.: PCT/CN2020/092142
§ 371 (c)(1),
(2) Date: Mar. 31, 2021

(87) PCT Pub. No.: WO2021/184539
PCT Pub. Date: Sep. 23, 2021

(65) Prior Publication Data
US 2022/0143514 A1 May 12, 2022

(30) Foreign Application Priority Data
Mar. 16, 2020 (CN) .......................... 202010181960.8

(51) Int. Cl.
*A63F 13/837* (2014.01)
*A63F 13/42* (2014.01)
*A63F 13/52* (2014.01)

(52) U.S. Cl.
CPC ............ *A63F 13/837* (2014.09); *A63F 13/42* (2014.09); *A63F 13/52* (2014.09); *A63F 2300/10* (2013.01);
(Continued)

(58) Field of Classification Search
CPC ...... A63F 13/42; A63F 13/52; A63F 2300/10; A63F 2300/8076; A63F 2300/8082
See application file for complete search history.

(56) References Cited

U.S. PATENT DOCUMENTS

| 2010/0210361 | A1 | 8/2010 | Crawford et al. |
| 2016/0084605 | A1* | 3/2016 | Monti .................. A63F 13/285 463/2 |
| 2018/0050268 | A1* | 2/2018 | Jones ..................... G06F 3/016 |

FOREIGN PATENT DOCUMENTS

| CN | 102580312 A | 7/2012 |
| CN | 104482803 A | 4/2015 |

(Continued)

OTHER PUBLICATIONS

Godlove Article, <Evaluation of IDOCOU Humanitarian VR Sensory Game Handles—Simplified but Not Simple Handles>,Jun. 28, 2017, https://zhuanlan.zhihu.com/p/27594422.
(Continued)

*Primary Examiner* — William H McCulloch, Jr.
*Assistant Examiner* — Ankit B Doshi
(74) *Attorney, Agent, or Firm* — Gang Yu

(57) ABSTRACT

The present disclosure provides a control method and apparatus for a Virtual Reality (VR) shooting game. The control method includes: detecting a shooting operation instruction in the VR shooting game; when the shooting operation instruction is detected, controlling a shooting weapon to execute a shooting action; in response to the shooting weapon executing the shooting action, applying a first acting force to a virtual weapon holder, the first acting force being used for simulating a recoil force to the virtual weapon holder when the shooting weapon executes the shooting action; calculating and controlling a position change of the virtual weapon holder based on the first acting force; and after the first force disappears, applying a second acting (Continued)

force to the virtual weapon holder, and calculating and controlling the position change of the virtual weapon holder based on the second acting force.

18 Claims, 3 Drawing Sheets

(52) U.S. Cl.
CPC ............... *A63F 2300/8076* (2013.01); *A63F 2300/8082* (2013.01)

(56) References Cited

FOREIGN PATENT DOCUMENTS

| | | |
|---|---|---|
| CN | 206444151 U | 8/2017 |
| CN | 108815851 A | 11/2018 |
| CN | 109011587 A | 12/2018 |
| CN | 109758762 A | 5/2019 |
| CN | 110559646 A | 12/2019 |

OTHER PUBLICATIONS

Xingzai, <This VR rifle can simulate the real recoil force and will support all VR platforms>, Aug. 9, 2016, https://vr.pconline.com.cn/823/8231322.html.

\* cited by examiner

METHOD AND APPARATUS FOR CONTROLLING VIRTUAL REALITY SHOOTING GAME

CROSS-REFERENCE TO RELATED APPLICATION

The present disclosure claims priority to Chinese Patent Application No. 202010181960.8, filed to the China National Intellectual Property Administration on Mar. 17, 2020 and entitled "Method and Apparatus for Controlling Virtual Reality Shooting Game", the entire contents of which are incorporated herein by reference.

TECHNICAL FIELD

The present disclosure relates to the technical field of games, and in particular to a method and apparatus for controlling a Virtual Reality (VR) shooting game.

BACKGROUND

In VR games, players need to be equipped with VR devices (generally including a head-mounted display and two VR controllers) in order to enter a virtual game world. For a VR shooting game, a player picks up a gun into the hand by pressing a grip key on a VR controller, and when the player pulls a trigger key of a handle after confirming aiming, then the gun in the VR shooting game generates a shooting action. For VR shooting games, the performance of a recoil force is particularly important.

In the existing VR shooting games, a solution that the recoil force is simulated by adopting an animation mode in part of traditional Personal Computer (PC) games and mobile games is generally used, i.e., during shooting, an animation is played to simulate a virtual hand to lift upward in the VR shooting game to achieve an effect that the virtual hand is lifted upwards due to the recoil force of a gun.

In summary, due to the great change of an interaction mode, the gun shooting recoil force solutions of the traditional PC games and mobile games are no longer suitable for VR shooting games. The solution that the recoil force is simulated in the animation mode in the traditional PC games and mobile games is still used in the existing VR shooting games, resulting in the absence of the game lifelikeness and poor experience for game players.

An effective solution has not been proposed yet currently for the foregoing problem.

SUMMARY

At least some embodiments of the present disclosure provide a method and apparatus for controlling a VR shooting game, so as at least to partially solve the technical problem that the gun shooting recoil force schemes for the traditional PC games and mobile games are no longer suitable for VR shooting games due to a great change of an interaction mode.

In an embodiment of the present disclosure, a method for controlling a VR shooting game is provided. The method is applied to a terminal device rendered with a graphical user interface. The graphical user interface may include a game screen which at least includes a shooting weapon and a virtual weapon holder for holding the shooting weapon. The method may include that: a shooting operation instruction in the VR shooting game is detected, wherein the shooting operation instruction is generated by a handle controller; upon the detection of the shooting operation instruction, the shooting weapon is controlled to execute a shooting action; in response to the shooting weapon executing the shooting action, a first acting force is applied to the virtual weapon holder, and the first acting force is used for simulating a recoil force to the virtual weapon holder when the shooting weapon executes the shooting action; a position change of the virtual weapon holder is calculated and controlled based on the first acting force as an input to a physical engine; and after the first force disappears, a second acting force is applied to the virtual weapon holder, and the position change of the virtual weapon holder is calculated and controlled based on the second acting force as the input to the physical engine.

In another embodiment of the present disclosure, an apparatus for controlling a VR shooting game is further provided. The apparatus is applied to a terminal device rendered with a graphical user interface. The graphical user interface may include a game screen which at least includes a shooting weapon and a virtual weapon holder for holding the shooting weapon. The apparatus may include: a detection component, configured to detect a shooting operation instruction in the VR shooting game, wherein the shooting operation instruction is generated by a handle controller; a first control component, configured to control, upon the detection of the shooting operation instruction, the shooting weapon to execute a shooting action; a first execution component, configured to apply, in response to the shooting weapon executing the shooting action, a first acting force to the virtual weapon holder, and the first acting force is used for simulating a recoil force to the virtual weapon holder when the shooting weapon executes the shooting action; a second control component, configured to calculate and control a position change of the virtual weapon holder based on the first acting force as an input to a physical engine; and a second execution component, configured to apply, after the first force disappears, a second acting force to the virtual weapon holder, and calculate and control the position change of the virtual weapon holder based on the second acting force as the input to the physical engine.

In another embodiment of the present disclosure, a storage medium is further provided. The storage medium may include a stored program. When the program is run, a device where the storage medium is located may be controlled to perform the method for controlling the VR shooting game mentioned above.

In another embodiment of the present disclosure, a processor is further provided. The processor may be configured to run a program. The program may be run to perform the method for controlling the VR shooting game mentioned above.

In the embodiments of the present disclosure, a manner in which a recoil force is achieved based on physical simulation is employed; the shooting operation instruction in the VR shooting game is detected, wherein the shooting operation instruction is generated by a handle controller; upon the detection of the shooting operation instruction, the shooting weapon is controlled to execute a shooting action; in response to the shooting weapon executing the shooting action, a first acting force is applied to the virtual weapon holder, and the first acting force is used for simulating a recoil force to the virtual weapon holder when the shooting weapon executes the shooting action; a position change of the virtual weapon holder is calculated and controlled based on the first acting force as an input to a physical engine; and after the first force disappears, a second acting force is applied to the virtual weapon holder, and the position change of the virtual weapon holder is calculated and controlled based on the second acting force as the input to the physical engine. The purpose of improving the game reality sense of the VR shooting game and enhancing the game experience of a player is served, thus the technical effects of meeting the immersion sense requirement of the player on the interaction of the VR shooting game and getting closer to realistic gun shooting experience sense are achieved, and the technical problem that the gun shooting recoil force schemes of the traditional PC games and mobile games are no longer suitable for VR shooting games due to the great change of the interaction mode is further solved.

BRIEF DESCRIPTION OF THE DRAWINGS

The accompanying drawings described herein are used to provide a further understanding of the present disclosure, and constitute a part of the present disclosure, and the exemplary embodiments of the present disclosure and the description thereof are used for explaining the present disclosure, but do not constitute improper limitations to the present disclosure. In the drawings.

DETAILED DESCRIPTION

Figure 1:
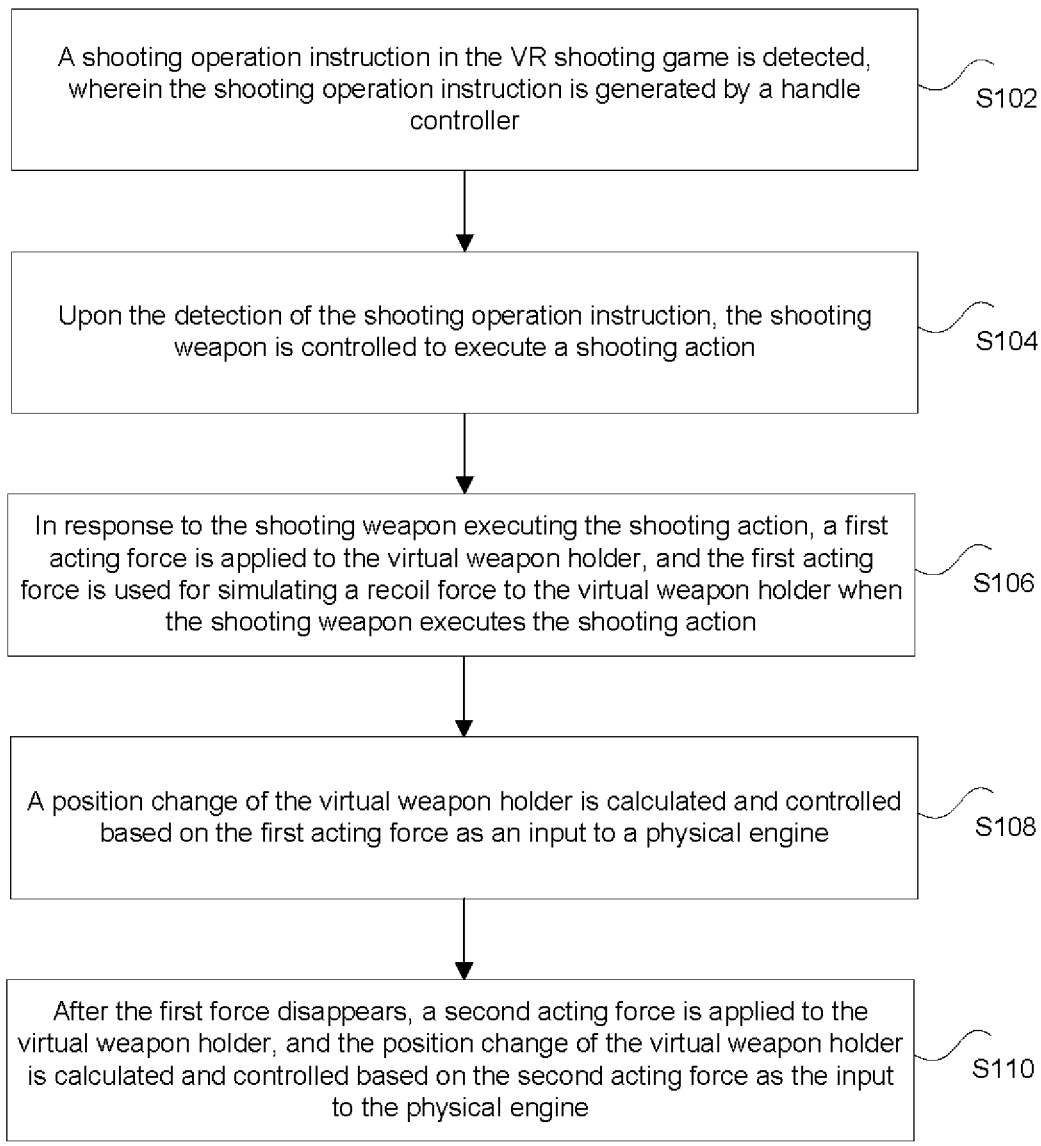
FIG. 1 is a flowchart of a method for controlling a VR shooting game according to an embodiment of the present disclosure.

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the terms "first", "second" and the like in the specification, the claims, and the drawings of the disclosure are used to distinguish similar objects, but not used to necessarily describe a specific sequence or a precedence order. It will be appreciated that data used in such a way may be exchanged under appropriate conditions, in order that the embodiments of the present disclosure described herein can be implemented in a sequence other than sequences graphically shown or described herein. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

First, in order to facilitate an understanding of the embodiments of the present disclosure, some terms or nouns referred to in the present disclosure will be explained as follows.

Head-Mounted Display refers to a display in a VR device worn in front of the eyes for displaying a picture within the VR.

Physical Simulation, in the present disclosure, refers to that a program algorithm does not move objects within a game directly by modifying positions of the objects within the game, but instead applies at least one force to the objects that causes a game physical engine to calculate the positional movement of the objects by applying the force.

Physical Engine refers to a component responsible for physical calculation within a game engine. Generally speaking, when the position of an object within a game is controlled by a physical engine, the physical engine may automatically calculate the position of the object at different time points according to the applied force by applying different degrees of force to the object.

Motion Sickness refers to a symptom of dizziness and nausea caused by judgment errors of the brain since a picture seen by a player is not matched with the real motion of the head of the player. When the player does not move the head but sees a wobbling picture, motion sickness may easily occur.

Grip Key refers to a key button on a handle of the player that is located at the middle finger when the player grips the handle with the hand, and is typically used for simulating the action of the player for picking up an item.

Trigger Key refers to a key button on a handle of the player that is located at the index finger when the player grips the handle with the hand, and is typically used for simulating a trigger-pulling shooting action of the player.

Model Penetration refers to overlapping of two otherwise non-overlapping objects in a game, for example, a hand stretching into a wall.

Frame refers to that when the game makes 30 logical updates within 1 second, the game is considered to have run for 30 frames within 1 second.

In the traditional shooting type mobile games and PC games, a player usually triggers a shooting mechanism by pressing a mouse button or a touch screen button, and the aiming direction of a gun is adjusted by moving a mouse and touching a touch screen. In this mode, the gun is generally fixed at the center of the screen, each time the gun shots, different degrees of recoil animation are triggered to simulate the influence of a recoil force on the gun. And meanwhile, the player feels the recoil force of the gun through trajectory simulation algorithms, micro-shake of the screen and changes of the crosshair.

However, in a VR shooting game, there is a true concept of a player's two hands within the VR game since the player holds two handle controllers with tracking. When the player holds the gun in hand, the gun is not held in the center of the player's perspective as is conventional, but rather held in the player's hand and movable as the player's hand moves. Therefore, the player may be more sensitive to the various motion activities of the gun than to those in the PC games and mobile games, because the player does not actually hold the gun in the PC games and mobile games, but merely controls a gun-holding character through the mouse and the touch screen. Since the picture seen by the player is controlled by the head-mounted display and thus not movable, the recoil force cannot be simulated by controlling the screen picture, otherwise the motion sickness may be generated. Moreover, since the gun is actually in hand within the VR game, there is also no concept of the crosshair in the center of the screen. The recoil force cannot be simulated by some motions of the crosshair.

In addition, for the solution of simulating the recoil force by adding animation to hands in the VR game at the present stage, the following defects also exist. First, since the hands within the VR move with the handle, which means that the gun-holding hands of the player may move almost anywhere in the game, such as beneath a table or blocking the gun with the other hand above, which is not feasible in traditional PC games and mobile games. Similarly, when animation is used for simulating the recoil force, some phenomena of model penetration may occur. Second, the sense of reality with respective to the animation simulating the recoil force during continuous shooting with a gun is not strong. Since VR players have converted from a keyboard-mouse operation to a real hand-held gun, the motion of the gun is more sensitive than the motion of the gun in PC games and mobile games.

In order to solve the above technical problems existing in the related art, the embodiments of the present disclosure provide a method and apparatus for controlling a VR shooting game as shown below.

According to the embodiments of the present disclosure, an embodiment of a method for controlling a VR shooting game is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence herein under certain circumstances.

The method for controlling a VR shooting game is applied to a terminal device rendered with a graphical user interface, the graphical user interface includes a game screen at least includes a shooting weapon and a virtual weapon holder for holding the shooting weapon. FIG. 1 is a flowchart of a method for controlling a VR shooting game according to an embodiment of the present disclosure. As shown in FIG. 1, the method includes the following steps.

In step S102, a shooting operation instruction in the VR shooting game is detected, and the shooting operation instruction is generated by a handle controller.

In step S104, upon the detection of the shooting operation instruction, the shooting weapon is controlled to execute a shooting action.

In step S106, in response to the shooting weapon executing the shooting action, a first acting force is applied to the virtual weapon holder, and the first acting force is used for simulating a recoil force to the virtual weapon holder when the shooting weapon executes the shooting action.

In step S108, a position change of the virtual weapon holder is calculated and controlled based on the first acting force as an input to a physical engine.

In step S110, after the first force disappears, a second acting force is applied to the virtual weapon holder, and the position change of the virtual weapon holder is calculated and controlled based on the second acting force as the input to the physical engine.

In the embodiments of the present disclosure, the manner in which a recoil force is achieved based on physical simulation is employed; the shooting operation instruction in the VR shooting game is detected, and the shooting operation instruction is generated by the handle controller; upon the detection of the shooting operation instruction, the shooting weapon is controlled to execute the shooting action; in response to the shooting weapon executing the shooting action, the first acting force is applied to the virtual weapon holder, and the first acting force is used for simulating the recoil force to the virtual weapon holder when the shooting weapon executes the shooting action; the position change of the virtual weapon holder is calculated and controlled based on the first acting force as the input to the physical engine; and after the first force disappears, the second acting force is applied to the virtual weapon holder, and the position change of the virtual weapon holder is calculated and controlled based on the second acting force as the input to the physical engine. The purpose of improving the game reality sense of the VR shooting game and enhancing the game experience of a player is served, thus the technical effects of meeting the immersion sense requirement of the player on the interaction of the VR shooting game and being closer to the real gun shooting experience sense are achieved, and the technical problem that the gun shooting recoil force schemes of the traditional PC games and mobile games are no longer suitable for VR shooting games due to a great change of an interaction mode is further solved.

It is to be noted that an executed subject of the method for controlling the VR shooting game provided by the embodiments of the present disclosure is a host device (for example a PC, a smart phone or a VR all-in-one machine with a host function and a display screen), that is, a game (physical) engine.

Optionally, the terminal device may be a head-mounted display entering the VR game world. For a VR shooting game, a player picks up a gun into a hand by pressing a grip key on a hand-held controller (e.g., a VR controller), and then a virtual shooting weapon is held in a virtual weapon holder of a game character controlled by the player in the VR shooting game and moves in real time in a game screen as the player's hand moves. The feeling given to the player is as if the player really holds a shooting weapon.

Optionally, the player may issue the shooting operation instruction by pressing the trigger key of the VR controller, and when detecting the shooting operation instruction, the shooting weapon in the game screen of the VR shooting game is controlled to perform a shooting operation, i.e., bullets in the shooting weapon are controlled to perform the shooting operation from a muzzle to a direction in which the shooting weapon is currently directed along a barrel.

As an optional embodiment, when the shooting weapon controlled by the player does not perform the shooting action, the virtual weapon holder moves following the shooting weapon. The game player performs a three-point one-line aiming by actually moving the hand holding the handle controller, the shooting weapon in the VR shooting game performs the shooting action when the shooting object is confirmed to be aimed and the player presses the trigger key of the VR controller, and the bullets are shot in the shooting direction in which the shooting weapon is directed.

Optionally, when the instant shooting judgment is carried out, a ray may be emitted in the directing direction of the shooting weapon at this moment, and an object hit by the ray is an object hit by the shooting action. When the non-instant shooting judgment is carried out, the directing direction of the shooting weapon may be input as the shooting direction of the non-instant judgment algorithm at this moment; and after the shooting direction of the bullet is simulated, the operation of simulating the recoil force in the VR shooting game is started.

It is to be noted that the instant shooting judgment and the non-instant shooting judgment are determined by the game settings and the type of gun held, i.e., are not determined at the occurrence time of the shooting action, but are preconfigured at the time of game design.

For example, when the VR shooting game is a cowboy battle shooting game, the shooting distance is typically about 20 meters, at which moment a revolver may use instant shooting judgment. Since the distance is very close, a time period from the occurrence of the shooting action to the hitting of the object is negligible, and the ballistic drop of the bullet due to flight may not be calculated. When the VR shooting game is a sniper game and a sniper gun is held in hand, the shooting distance is relatively long, the time period from the occurrence of the shooting action to hitting of the object cannot be negligible, and the falling of the bullet caused by the long flight needs to be calculated. That is, the instant judgment cannot be adopted, and the non-instant judgment needs to be adopted.

In an optional embodiment, the first acting force and the second acting force are tension forces.

It is to be noted that both the first and second acting forces act on the virtual weapon holder for holding the shooting weapon to enhance the game sense of reality of the VR shooting game and enhance the game experience of the game player.

In an optional embodiment, a first acting force is applied to the virtual weapon holder in response to the shooting action being performed by the shooting weapon. Optionally, the first acting force includes a first tension force (instant tension force) and a first torsion force (instant torsion force). The recoil force to the virtual weapon holder when the shooting action is performed by the shooting weapon may be simulated through the first acting force. That is, the operation that the position change of the virtual weapon holder is calculated and controlled based on the first acting force as the input to the physical engine includes that the virtual weapon holder is calculated and controlled to move from a first position to a second position.

In another optional embodiment, a second acting force is applied to the virtual weapon holder after the first acting force disappears. Optionally, the second acting force includes a second tension force (rebound tension force) and a second torsion force (rebound torsion force). The operation that the position change of the virtual weapon holder is calculated and controlled based on the second acting force as the input to the physical engine includes that the virtual weapon holder is calculated and controlled to move from the second position to the first position, so as to complete a recoil force simulation process.

In an optional embodiment, the method further includes the following steps.

In step S202, once the first acting force is applied to the virtual weapon holder, a first torsion force is applied to the virtual weapon holder to control the virtual weapon holder to move upwards under an action of the first torsion force.

Optionally, the upward direction in step S202 refers to an upward direction relative to a first position of the virtual weapon holder. Once the first acting force is applied to the virtual weapon holder, the first torsion force is applied to the virtual weapon holder to control the virtual weapon holder to move upwards under the action of the first torsion force.

In an optional embodiment, the method further includes the following steps.

In step S204, once the second acting force is applied to the virtual weapon holder, a second torsion force is applied to the virtual weapon holder to control the virtual weapon holder to move downwards under an action of the second torsion force.

Optionally, the downward direction in step S204 refers to a downward direction relative to a second position of the virtual weapon holder and is opposite to the upward direction in step S202. Once the second acting force is applied to the virtual weapon holder, the second torsion force is applied to the virtual weapon holder to control the virtual weapon holder to move downwards under the action of the second torsion force.

In an optional embodiment, the operation that the virtual weapon holder is controlled to move upwards under the action of the first torsion force includes the following step.

In step S302, the virtual weapon holder is controlled to rotate towards a direction indicated by the first torsion force under the action of the first torsion force, such that the virtual weapon holder is displaced upwards.

Optionally, in the above embodiment of the present disclosure, the virtual weapon holder is controlled to rotate towards a direction indicated by the first torsion force under the action of the first torsion force, such that the virtual weapon holder is displaced upwards.

In an optional embodiment, the operation that the virtual weapon holder is controlled to move downwards under the action of the second torsion force includes the following steps.

In step S304, the virtual weapon holder is controlled to rotate towards a direction indicated by the second torsion force under the action of the second torsion force, such that the virtual weapon holder is displaced downwards.

Optionally, in the above embodiment of the present disclosure, the virtual weapon holder is controlled to rotate towards a direction indicated by the second torsion force under the action of the second torsion force, such that the virtual weapon holder is displaced downwards.

In an optional embodiment, the operation that the position change of the virtual weapon holder is calculated and controlled based on the first acting force as the input to the physical engine includes that: the virtual weapon holder is calculated and controlled to move from the first position as a current position to the second position based on the first acting force as the input to the physical engine.

In another optional embodiment, the operation that the position change of the virtual weapon holder is calculated and controlled based on the second acting force as the input to the physical engine includes that: the virtual weapon holder is calculated and controlled to move from the second position to a third position based on the second acting force as the input to the physical engine.

In the above optional embodiments, a distance between the second position and the first position is greater than a distance between the third position and the first position.

In an optional embodiment, the first position may be equal to the third position.

In an optional embodiment, the method further includes the following steps.

In step S402, once the distance between the third position and the first position is within a pre-set distance range, the second tension force is stopped to be applied to the virtual weapon holder.

Optionally, the second tension force is a rebound tension force. In the above optional embodiments, in order to improve the game sense of reality based on the physically simulated recoil force, the second tension force fails when the distance between the third position and the first position is within a pre-set distance range and the second tension force is stopped to be applied to the virtual weapon holder in the case that the virtual weapon holder of the game character gradually rebounds to the third position under the continuous action of the second acting force.

Optionally, the pre-set distance range may be configured in a configuration file for the VR shooting game. The specific configuration manner is to write numbers in the configuration file, e.g., 2 cm, 5 cm, and etc.

In an optional embodiment, the method further includes the following steps.

In step S502, once an angle deflected by the virtual weapon holder under the actions of the first torsion force and the second torsion force relative to an initial posture of the virtual weapon holder is within a pre-set angle range, the second torsion force is stopped to be applied to the virtual weapon holder, and the initial posture of the virtual weapon holder is a posture of the virtual weapon holder before applying the first torsion force.

Optionally, the second torsion force is a rebound torsion force. In the above optional embodiments, in order to improve the game sense of reality based on the physically simulated recoil force, once the angle deflected by the virtual weapon holder under the actions of the first torsion force and the second torsion force of the virtual weapon holder of the game character relative to an initial posture of the virtual weapon holder is within a pre-set angle range, the second torsion force fails, and the second torsion force is stopped to be applied to the virtual weapon holder.

Optionally, the pre-set angle range may be configured in a configuration file for the VR shooting game. The specific configuration manner is to write numbers in the configuration file, e.g., 2 degrees, 3 degrees, etc.

Figure 2:
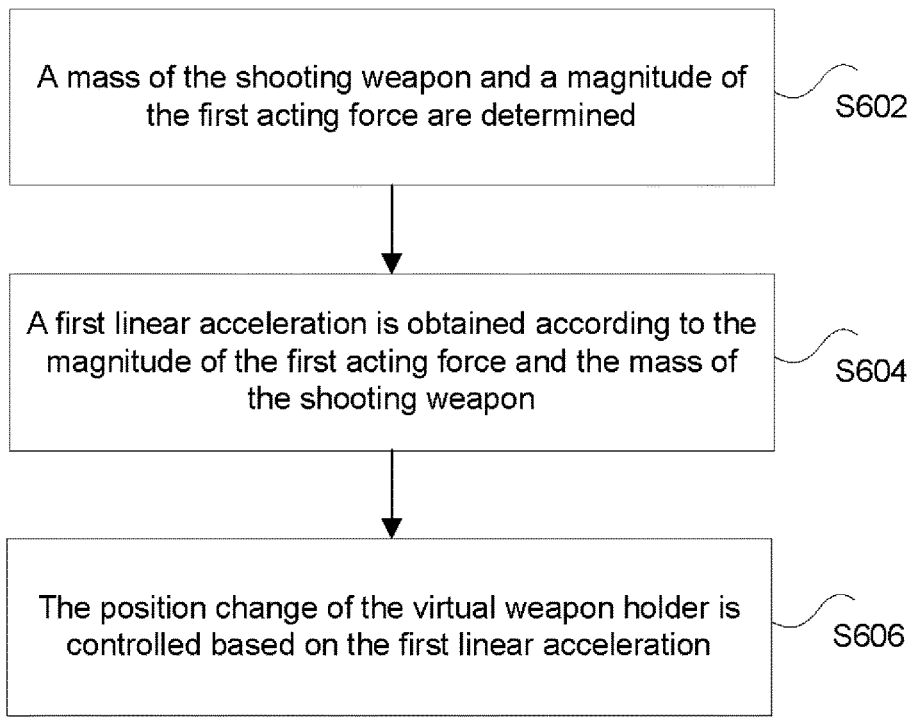
FIG. 2 is a flowchart of a method for controlling a VR shooting game according to an optional embodiment of the present disclosure.

In an optional embodiment, FIG. 2 is a flowchart of a method for controlling a VR shooting game according to an optional embodiment of the present disclosure. As shown in FIG. 2, the operation that the position change of the virtual weapon holder is calculated and controlled based on the first acting force as the input to the physical engine includes the following steps.

In step S602, a mass of the shooting weapon and a magnitude of the first acting force are determined.

In step S604, a first linear acceleration is obtained according to the magnitude of the first acting force and the mass of the shooting weapon.

In step S606, the position change of the virtual weapon holder is controlled based on the first linear acceleration.

When it is determined that the shooting weapon performs a shooting operation, the first tension force and the first torsion force are applied to the virtual weapon holder to enable the virtual weapon holder to obtain the first linear acceleration. The first linear acceleration is determined according to the mass of the shooting weapon and the magnitude of the first acting force. And after obtaining the first linear acceleration, the position change of the virtual weapon holder is controlled based on the first linear acceleration. That is, the virtual weapon holder is controlled to move in the direction directed by the first tension force and to rotate in the direction directed by the first torsion force.

In the above optional embodiments, the direction and magnitude of the first tension force and the first torsion force may be configured in a configuration file in a VR shooting game, and the corresponding masses of different shooting weapons may also be configured in the configuration file. It is to be noted that the first acting force in the embodiments of the present disclosure is a vector and the magnitude and direction of the first acting force need to be configured in the configuration file. When the first acting force is configured, the magnitude of the first acting force is filled with numbers at the corresponding positions of the configuration parameters, and the direction of the first acting force is filled with vectors at the corresponding positions of the configuration parameters. In the embodiments of the present disclosure, the standard of good user experience can be achieved through the repeated experience of the configuration parameters.

According to Newton's second law: $F = M \cdot A$,

F refers to the applied first acting force, M refers to the mass of the shooting weapon, and A refers to the first linear acceleration generated under the action of the first acting force. It is to be noted that the first linear acceleration A is proportional to the applied first acting force F and is inversely proportional to the mass M of the shooting weapon.

Since the virtual weapon holder is applied with the first acting force to generate the first linear acceleration in a current frame, the virtual weapon holder will be driven by the first linear acceleration in the next few frames, i.e. the virtual weapon holder is controlled to move from the first position to the second position.

Figure 3:
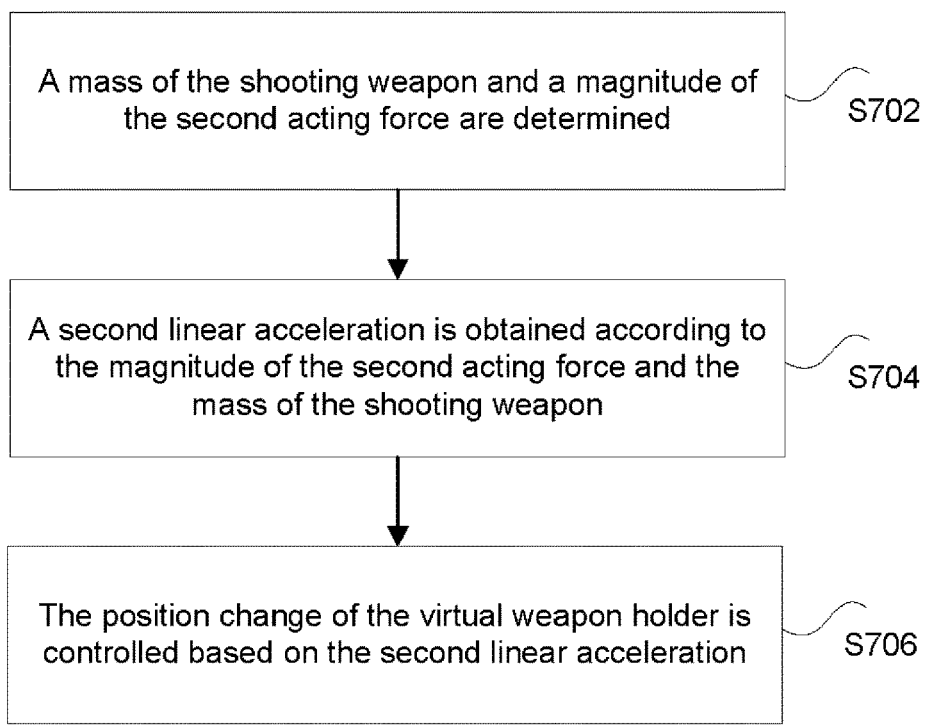
FIG. 3 is a flowchart of a method for controlling a VR shooting game according to an optional embodiment of the present disclosure.

In an optional embodiment, FIG. 3 is a flowchart of a method for controlling a VR shooting game according to an optional embodiment of the present disclosure. As shown in FIG. 3, the operation that the position change of the virtual weapon holder is calculated and controlled based on the second acting force as the input to the physical engine includes the following steps.

In step S702, a mass of the shooting weapon and a magnitude of the second acting force are determined.

In step S704, a second linear acceleration is obtained according to the magnitude of the second acting force and the mass of the shooting weapon.

In step S706, the position change of the virtual weapon holder is controlled based on the second linear acceleration.

Optionally, in step S704, the calculation mode for obtaining the second linear acceleration based on the magnitude of the second acting force and the mass of the shooting weapon may be the same as the calculation mode for obtaining the first linear acceleration based on the magnitude of the first acting force and the mass of the shooting weapon in step S604.

In the embodiments of the present disclosure, after detecting the disappearance of the first acting force, a second acting force is continuously applied to the virtual weapon holder. The operation that the position change of the virtual weapon holder is calculated and controlled based on the second acting force as the input to the physical engine includes that a second tension force and a second torsion force are applied to the virtual weapon holder, and under the action of the second tension force and the second torsion force, the virtual weapon holder is controlled to restore from the second position to the first position; or restore from the second position to a third position, and the distance between the third position and the first position is within a pre-set distance range.

It is to be noted that the direction of the second tension force is directed towards the first position of the virtual weapon holder in order to pull the virtual weapon holder away from the first position (driven to the second position) by the recoil force back to the first position. It is to be noted that the direction and magnitude of the second tension force and the second torsion force may be configured in a configuration file, and the corresponding mass of the shooting weapon may also be configured in the configuration file. It is to be noted that the second acting force in the embodiments of the present disclosure is a vector and the magnitude and direction of the second acting force need to be configured in the configuration file. When the second acting force is configured, the magnitude of the second acting force is filled with numbers at the corresponding positions of the configuration parameters, and the direction of the second acting force is filled with vectors at the corresponding positions of the configuration parameters. In the embodiments of the present disclosure, the standard of good user experience can be achieved through the repeated experience of the configuration parameters.

In the above optional embodiments, after the second acting force fails, the virtual weapon holder continues to follow the movement of the VR controller and the physical simulation flow of one recoil force ends. When a shooting action is detected to occur again in the recoil force simulation process, the step of applying the first acting force to the virtual weapon holder is directly returned to be executed, it is not necessary to wait for the second acting force to pull the virtual weapon holder back to the first position, and the technical effect that the gun shooting weapon is continuously influenced by the recoil force due to the continuous shooting trajectory and the directing direction of the gun may be achieved through the above operation.

The embodiments of the present disclosure mainly realizes an implementation solution based on physical simulation of the recoil force in the VR shooting game, and can solve the following problems in the related art: in the VR shooting game that realistically simulates the recoil force generated by gun shooting in reality, when a shooting weapon is detected to execute the shooting action, the first acting force is applied to the virtual weapon holder of the game character to control the position change of the virtual weapon holder; when the gun is blocked by the object above (such as a hand or a wooden plate), the recoil force of the gun may naturally generate some counteracting effects due to physical collision, such that the problem that the model is penetrated or other objects are ejected due to the recoil force can be avoided for free two-hand movement in the VR, and a more realistic physical collision can be generated; in the continuous shooting state, the virtual weapon holder is pulled to move by continuously applying the first acting force, such that a very natural continuous shooting effect can be generated; the recoil simulation is no longer dependent on elements which do not exist in the VR shooting game such as crosshairs and picture shakes in traditional PC games or mobile games.

Figure 4:
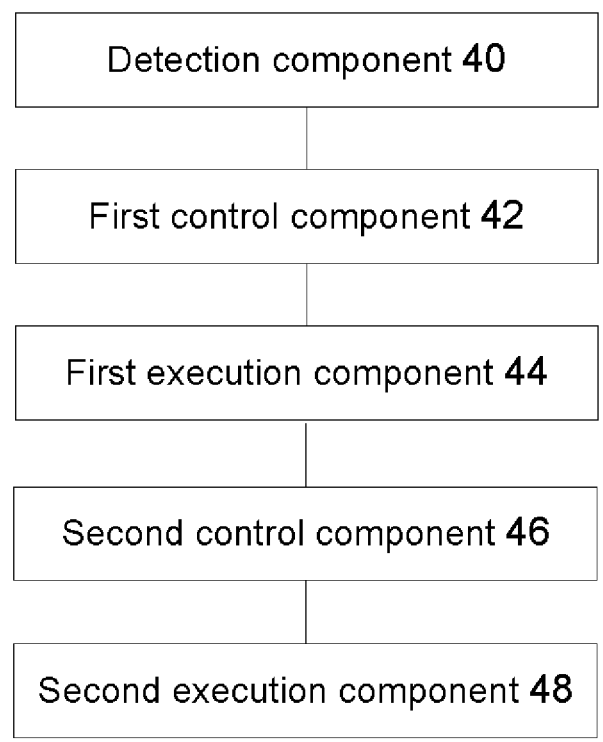
FIG. 4 is a structural schematic diagram of an apparatus for controlling a VR shooting game according to an embodiment of the present disclosure.

According to the embodiments of the present disclosure, an apparatus embodiment for implementing the method for controlling a VR shooting game is further provided. FIG. 4 is a structural schematic diagram of an apparatus for controlling a VR shooting game according to an embodiment of the present disclosure. As shown in FIG. 4, the apparatus for controlling a VR shooting game is applied to a terminal device rendered with a graphical user interface through, the graphical user interface includes a game screen, and the game screen at least includes a shooting weapon and a virtual weapon holder for holding the shooting weapon. The apparatus includes: a detection component 40, a first control component 42, a first execution component 44, a second control component 46, and a second execution component 48.

The detection component 40 is configured to detect a shooting operation instruction in the VR shooting game, and the shooting operation instruction is generated by a handle controller. The first control component 42 is configured to control, upon the detection of the shooting operation instruction, the shooting weapon to execute a shooting action. The first execution component 44 is configured to apply, in response to the shooting weapon executing the shooting action, a first acting force to the virtual weapon holder, and the first acting force is used for simulating a recoil force to the virtual weapon holder when the shooting weapon executes the shooting action. The second control component 46 is configured to calculate and control a position change of the virtual weapon holder based on the first acting force as an input to a physical engine. The second execution component 48 is configured to apply, after the first force disappears, a second acting force to the virtual weapon holder, and calculate and control the position change of the virtual weapon holder based on the second acting force as the input to the physical engine.

It is to be noted that each of the above components may be implemented by software or hardware. For example, for the latter, it may be implemented by the following manners that the above components may be located in the same processor; or, the above components are located in different processors in any combination manner.

It is to be noted here that the detection component 40, the first control component 42, the first execution component 44, the second control component 46, and the second execution component 48 correspond to steps S102 to S110 in the method embodiment, and the above components correspond to the examples and application scenarios implemented by the corresponding steps, but are not limited to the disclosed content of the above method embodiment. It is to be noted that the above components may be run in a computer terminal as part of the apparatus. The functions implemented by the above components may be executed by a processor in the computer terminal. The terminal may also be a smart phone (such as an Android phone or an iOS phone), a tablet computer, a palmtop, a Mobile Internet Device (MID), a PAD, or other terminal devices.

It is to be noted that optional or preferred implementation manners of the present embodiment may be found in the relevant description of the method embodiments and will not be described in detail herein.

The various functional elements provided by the embodiments of the application may be run in a mobile terminal, a computer terminal or a similar computation device, or may be stored as part of the storage medium.

Therefore, an embodiment of the present disclosure may provide a computer terminal, which may be any computer terminal device in a computer terminal group. Optionally, in the present embodiment, the computer terminal may also be replaced with a terminal device such as a mobile terminal.

Optionally, in the present embodiment, the computer terminal may be located in at least one of multiple network devices in a computer network.

In the present embodiment, the computer terminal may execute the program code of the following steps in the method for controlling a VR shooting game: detecting a shooting operation instruction in the VR shooting game, and the shooting operation instruction is generated by a handle controller; upon the detection of the shooting operation instruction, controlling a shooting weapon to execute a shooting action; in response to the shooting weapon executing the shooting action, applying a first acting force to a virtual weapon holder, and the first acting force is used for simulating a recoil force to the virtual weapon holder when the shooting weapon executes the shooting action; calculating and controlling a position change of the virtual weapon holder based on the first acting force as an input to a physical engine; and after the first force disappears, applying a second acting force to the virtual weapon holder, and calculating and controlling the position change of the virtual weapon holder based on the second acting force as the input to the physical engine.

Optionally, the computer terminal may include: at least one processor, memory and transmission device.

The memory may be configured to store a software program and a component, such as a program instruction/component corresponding to the game character control method and apparatus in the embodiment of the present disclosure, and the processor executes various functional applications and data processing by running the software program and the component stored in the memory, that is, implements the above method for controlling a VR shooting game. The memory may include a high speed random access memory and may also include a non-transitory memory such as one or more magnetic storage devices, a flash memory, or other non-transitory solid state memories. In some examples, the memory may further include memories remotely located relative to the processor, which may be connected to the terminal over a network. The examples of such networks include, but are not limited to, the Internet, the Intranet, local area networks, mobile communication networks, and combinations thereof.

The transmission device is configured to receive or send data via a network. The above specific network example may include a wired network and a wireless network. In one example, the transmission device includes a Network Interface Controller (NIC) that may be connected with other network devices and routers through cables to communicate with the Internet or a local area network. In one example, the transmission apparatus may be a Radio Frequency (RF) component for communicating with the Internet wirelessly.

Those skilled in the art can understand that the computer terminal may also be a terminal device such as a smart phone (such as an Android phone or an iOS phone), a tablet, a pocket computer, a MID and a PAD.

Those of ordinary skill in the art can understand that all or part of the steps in various methods of the above embodiments may be completed by a program to instruct the related hardware of the terminal device. The program may be stored in a computer-readable storage medium. The storage medium may include a flash disk, a Read-Only Memory (ROM), a Random Access Memory (RAM), a magnetic disk or an optical disk, and the like.

The above apparatus for controlling a VR shooting game may further include a processor and a memory. The detection component 40, the first control component 42, the first execution component 44, the second control component 46, the second execution component 48 and the like are all stored in the memory as program elements, and the processor executes the program elements stored in the memory to realize corresponding functions.

The processor includes a core, a corresponding program element is called from the memory by the core, and there may be one or more cores. The memory may include a non-persistent memory, a RAM, and/or a non-transitory memory in a computer-readable medium, such as a ROM or a flash RAM. The memory includes at least one memory chip.

According to the embodiments of the present disclosure, a storage medium embodiment is further provided. Optionally, in the present embodiment, the storage medium includes a stored program. When the program is run, a device where the storage medium is located is controlled to perform any one of the above methods for controlling a VR shooting game.

Optionally, in the present embodiment, the storage medium may be located in any one of a group of computer terminals in a computer network, or in any one of a group of mobile terminals, the storage medium including a stored program.

Optionally, the program is run to control the device where the storage medium is located to execute the following functions: detecting a shooting operation instruction in the VR shooting game, and the shooting operation instruction is generated by a handle controller; upon the detection of the shooting operation instruction, controlling a shooting weapon to execute a shooting action; in response to the shooting weapon executing the shooting action, applying a first acting force to a virtual weapon holder, and the first acting force is used for simulating a recoil force to the virtual weapon holder when the shooting weapon executes the shooting action; calculating and controlling a position change of the virtual weapon holder based on the first acting force as an input to a physical engine; and after the first force disappears, applying a second acting force to the virtual weapon holder, and calculating and controlling the position change of the virtual weapon holder based on the second acting force as the input to the physical engine.

According to the embodiments of the present disclosure, a processor embodiment is further provided. Optionally, in the present embodiment, the processor is configured to run a program. The program is run to perform any one of the above methods for controlling a VR shooting game.

The embodiments of the present disclosure provide a device. The device includes a processor, a memory, and a program stored on the memory and executable on the processor. The processor, when executing the program, performs the following steps: detecting a shooting operation instruction in the VR shooting game, and the shooting operation instruction is generated by a handle controller; upon the detection of the shooting operation instruction, controlling a shooting weapon to execute a shooting action; in response to the shooting weapon executing the shooting action, applying a first acting force to a virtual weapon holder, and the first acting force is used for simulating a recoil force to the virtual weapon holder when the shooting weapon executes the shooting action; calculating and controlling a position change of the virtual weapon holder based on the first acting force as an input to a physical engine; and after the first force disappears, applying a second acting force to the virtual weapon holder, and calculating and controlling the position change of the virtual weapon holder based on the second acting force as the input to the physical engine.

The present disclosure also provides a computer program product, which, when executed on a data processing device, is adapted to execute a program initialized with the following method steps: detecting a shooting operation instruction in the VR shooting game, and the shooting operation instruction is generated by a handle controller; upon the detection of the shooting operation instruction, controlling a shooting weapon to execute a shooting action; in response to the shooting weapon executing the shooting action, applying a first acting force to a virtual weapon holder, and the first acting force is used for simulating a recoil force to the virtual weapon holder when the shooting weapon executes the shooting action; calculating and controlling a position change of the virtual weapon holder based on the first acting force as an input to a physical engine; and after the first force disappears, applying a second acting force to the virtual weapon holder, and calculating and controlling the position change of the virtual weapon holder based on the second acting force as the input to the physical engine.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present disclosure, it is to be understood that the disclosed technical content may be implemented in other manners. The device embodiments described above are merely illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into a processing element, each element may also physically exist independently, and at least two elements may also be integrated into an element. The integrated element may be implemented in a hardware form and may also be implemented in form of software functional element.

The integrated element may be stored in a computer-readable storage medium when being implemented in the form of a software functional element and sold or used as a standalone product. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementation of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. A method for controlling a Virtual Reality (VR) shooting game, applied to a terminal device rendered with a graphical user interface, wherein the graphical user interface comprises a game screen at least comprising a shooting weapon and a virtual weapon holder for holding the shooting weapon, the method comprising:

detecting a shooting operation instruction in the VR shooting game, wherein the shooting operation instruction is generated by a handle controller;

upon the detection of the shooting operation instruction, controlling the shooting weapon to execute a shooting action;

in response to executing the shooting action, applying a first acting force to the virtual weapon holder, wherein the first acting force is used for simulating a recoil force to the virtual weapon holder when executing the shooting action;

calculating and controlling a position change of the virtual weapon holder based on the first acting force as an input to a physical engine; and after the first force disappears, applying a second acting force to the virtual weapon holder, and calculating and controlling the position change of the virtual weapon holder based on the second acting force as another input to the physical engine;

wherein the first acting force comprises a first tension force and a first torsion force, and the second acting force comprises a second tension force and a second torsion force;

wherein calculating and controlling the position change of the virtual weapon holder based on the first acting force as the input to the physical engine comprises: calculating and controlling the virtual weapon holder to move from a first position as a current position to a second position based on the first acting force as the input to the physical engine; and calculating and controlling the position change of the virtual weapon holder based on the second acting force as the another input to the physical engine comprises: calculating and controlling the virtual weapon holder to move from the second position to a third position based on the second acting force as the another input to the physical engine, wherein a distance between the second position and the first position is greater than a distance between the third position and the first position.

2. The control method as claimed in claim 1, further comprising:

once the first tension force is applied to the virtual weapon holder, applying the first torsion force to the virtual weapon holder to control the virtual weapon holder to move upwards under an action of the first torsion force.

3. The control method as claimed in claim 2, further comprising:

once the second tension force is applied to the virtual weapon holder, applying the second torsion force to the virtual weapon holder to control the virtual weapon holder to move downwards under an action of the second torsion force.

4. The control method as claimed in claim 2, wherein controlling the virtual weapon holder to move upwards under the action of the first torsion force comprises:

controlling the virtual weapon holder to rotate towards a direction indicated by the first torsion force under the action of the first torsion force, such that the virtual weapon holder is displaced upwards.

5. The control method as claimed in claim 3, wherein controlling the virtual weapon holder to move downwards under the action of the second torsion force comprises:

controlling the virtual weapon holder to rotate towards a direction indicated by the second torsion force under the action of the second torsion force, such that the virtual weapon holder is displaced downwards.

6. The control method as claimed in claim 1, wherein the first position is the same as the third position.

7. The control method as claimed in claim 1, further comprising:
once the distance between the third position and the first position is within a pre-set distance range, stopping applying the second tension force to the virtual weapon holder.

8. The control method as claimed in claim 3, further comprising:
once an angle deflected by the virtual weapon holder under the actions of the first torsion force and the second torsion force relative to an initial posture of the virtual weapon holder is within a pre-set angle range, stopping applying the second torsion force to the virtual weapon holder, wherein the initial posture of the virtual weapon holder is a posture of the virtual weapon holder before applying the first torsion force.

9. The control method as claimed in claim 1, wherein calculating and controlling the position change of the virtual weapon holder based on the first acting force as the input to the physical engine comprises:
determining a mass of the shooting weapon and a magnitude of the first acting force;
obtaining a first acceleration according to the magnitude of the first acting force and the mass of the shooting weapon; and
controlling the position change of the virtual weapon holder based on the first acceleration.

10. The control method as claimed in claim 9, wherein controlling the position change of the virtual weapon holder based on the first acceleration comprises:
controlling the virtual weapon holder to move from the first position to the second position based on the first acceleration.

11. The control method as claimed in claim 1, wherein calculating and controlling the position change of the virtual weapon holder based on the second acting force as the input to the physical engine comprises:
determining a mass of the shooting weapon and a magnitude of the second acting force;
obtaining a second acceleration according to the magnitude of the second acting force and the mass of the shooting weapon; and
controlling the position change of the virtual weapon holder based on the second acceleration.

12. The control method as claimed in claim 11, wherein controlling the position change of the virtual weapon holder based on the second acceleration comprises:
controlling the virtual weapon holder to restore from the second position to the first position or to restore from the second position to the third position based on the second acceleration, wherein a distance between the third position and the first position is within a pre-set distance range.

13. The control method as claimed in claim 12, further comprising:
before the virtual weapon holder is pulled back to the first position based on the second acting force, reapplying the first acting force to the virtual weapon holder when the shooting operation command is detected again.

14. The control method as claimed in claim 1, wherein the terminal device is a head-mounted display.

15. The control method as claimed in claim 1, wherein the second position is located above the first position.

16. The control method as claimed in claim 1, wherein the third position is located below the second position.

17. A non-transitory computer-readable storage medium, comprising a stored program, wherein when the program is run, a device where the storage medium is located is controlled to perform the following steps:
detecting a shooting operation instruction in the VR shooting game, wherein the shooting operation instruction is generated by a handle controller;
upon the detection of the shooting operation instruction, controlling the shooting weapon to execute a shooting action;
in response to executing the shooting action, applying a first acting force to the virtual weapon holder, wherein the first acting force is used for simulating a recoil force to the virtual weapon holder when executing the shooting action;
calculating and controlling a position change of the virtual weapon holder based on the first acting force as an input to a physical engine; and
after the first force disappears, applying a second acting force to the virtual weapon holder, and calculating and controlling the position change of the virtual weapon holder based on the second acting force as another input to the physical engine;
wherein the first acting force comprises a first tension force and a first torsion force, and the second acting force comprises a second tension force and a second torsion force;
wherein calculating and controlling the position change of the virtual weapon holder based on the first acting force as the input to the physical engine comprises: calculating and controlling the virtual weapon holder to move from a first position as a current position to a second position based on the first acting force as the input to the physical engine; and calculating and controlling the position change of the virtual weapon holder based on the second acting force as the another input to the physical engine comprises: calculating and controlling the virtual weapon holder to move from the second position to a third position based on the second acting force as the another input to the physical engine, wherein a distance between the second position and the first position is greater than a distance between the third position and the first position.

18. A processor, configured to run a program, wherein the program is run to perform the following steps:
detecting a shooting operation instruction in the VR shooting game, wherein the shooting operation instruction is generated by a handle controller;
upon the detection of the shooting operation instruction, controlling the shooting weapon to execute a shooting action;
in response to executing the shooting action, applying a first acting force to the virtual weapon holder, wherein the first acting force is used for simulating a recoil force to the virtual weapon holder when executing the shooting action;
calculating and controlling a position change of the virtual weapon holder based on the first acting force as an input to a physical engine; and
after the first force disappears, applying a second acting force to the virtual weapon holder, and calculating and controlling the position change of the virtual weapon holder based on the second acting force as another input to the physical engine;

wherein the first acting force comprises a first tension force and a first torsion force, and the second acting force comprises a second tension force and a second torsion force;

wherein calculating and controlling the position change of the virtual weapon holder based on the first acting force as the input to the physical engine comprises: calculating and controlling the virtual weapon holder to move from a first position as a current position to a second position based on the first acting force as the input to the physical engine; and calculating and controlling the position change of the virtual weapon holder based on the second acting force as the another input to the physical engine comprises: calculating and controlling the virtual weapon holder to move from the second position to a third position based on the second acting force as the another input to the physical engine, wherein a distance between the second position and the first position is greater than a distance between the third position and the first position.

* * * * *